United States Patent
Erb et al.

[11] Patent Number: 5,920,622
[45] Date of Patent: Jul. 6, 1999

[54] MULTIPLE OWNER RESOURCE MANAGEMENT

[75] Inventors: Paul Erb, Ottawa; Danny Normand Prairie, Kanata, both of Canada

[73] Assignee: Mitel Corporation, Kanata, Canada

[21] Appl. No.: 08/743,346

[22] Filed: Nov. 4, 1996

[30] Foreign Application Priority Data

Jul. 11, 1996 [CA] Canada ................................. 2181009

[51] Int. Cl.[6] .............................. H04M 3/00; H04M 3/42; H04Q 3/64
[52] U.S. Cl. ...................... 379/265; 370/261; 370/270; 379/204; 379/215; 379/309
[58] Field of Search ...................... 379/202, 203, 379/204, 205, 206, 215, 265, 266, 309; 370/260, 261, 262, 263, 264, 265, 266, 267, 268, 269, 270

[56] References Cited

U.S. PATENT DOCUMENTS

| | | | |
|---|---|---|---|
| 4,881,261 | 11/1989 | Oliphant et al. ...................... | 379/266 X |
| 4,961,224 | 10/1990 | Yung ...................................... | 340/825.31 |
| 5,297,283 | 3/1994 | Kelly, Jr. et al. ......................... | 395/674 |
| 5,317,749 | 5/1994 | Dahlen ..................................... | 395/726 |

FOREIGN PATENT DOCUMENTS

| | | | |
|---|---|---|---|
| 0 013 301 | 7/1980 | European Pat. Off. ........ | G06F 15/16 |
| 403280775 | 12/1991 | Japan ..................................... | 379/215 |
| 1 425 235 | 2/1976 | United Kingdom .............. | G06F 9/18 |
| 2 308 780 | 7/1997 | United Kingdom ............. | H04Q 3/00 |
| WO 83/04117 | 11/1983 | WIPO ................................ | G06F 9/46 |

*Primary Examiner*—Harry S. Hong
*Attorney, Agent, or Firm*—Pascal & Associates

[57] ABSTRACT

A method of management of resources in a multiple process system providing a list of resource owner identities, storing in an owner list the identity of at least one process with a resource which the at least one process has a right to operate, and allowing only a process listed with a resource to use the resource.

6 Claims, 5 Drawing Sheets

1. FUNCTION can_become_owner_of (potential_owner,
                                 resource): BOOLEAN
2. BEGIN
3.    IF (resource is in use AND
4.        potential_owner = supervisor) OR
5.        (resource is NOT in use) THEN
6.        RETURN TRUE;
7.    ELSE
8.        RETURN FALSE;
9.    ENDIF;
10. END;

MULTIPLE OWNER RESOURCE MANAGEMENT

FIELD OF THE INVENTION

This invention relates to methods of managing resource elements such as those used in telephone switching systems.

BACKGROUND TO THE INVENTION

Telephone switching systems such a PABXs and central offices provide specialized applications, such as automatic call distribution (ACD) which distributes incoming calls among agents. Such systems can be used for answering inquiries as to departure or arrival times of aircraft, to take reservations for theater, aircraft, trains, etc., to take telephone orders, etc.

In such systems, when a subscriber calls a telephone number, such as an 800 or 888 number, the telephone system routes the call to an idle agent within a hunt group of agents accessed by the number. All agents within the group are accessible by the same number, but the system determines which agent has been the "longest idle agent" and routes the call to that agent.

U.S. Pat. No. 5,515,428, issued May 7, 1996, invented by Mark Sestak and Paul Erb, and assigned to Mitel Corporation, describes prior art methods and a new method for keeping track of idle agents and for identifying which agent is the longest idle agent. In such systems, when an agent is servicing a caller, the agent's line is marked as busy, and the agent becomes unavailable for other calls. Thus in the event another caller attempts to call the agent, the request is denied.

However, it is sometimes necessary for the agent to access a supervisor or an information source line and conference the supervisor's or information line with that of the customer. With the agent's line being marked as busy, this has not been able to be done in such systems.

SUMMARY OF THE INVENTION

In accordance with an embodiment of the present invention, resources such as agent's lines are listed, e.g. in a table, and processes for operating various functions of the system, such as a process for operating a supervisor's line, are entered against each resource. Plural processes can be entered against a particular resource; all processes that are entered against a particular resource are allowed to use the resource independently or together.

For example, assume that both an agent process and a supervisor process are entered in a list in the table with the agent resource. During a call in progress, the supervisor requests to join the call. By the use of the present invention, the associated supervisor process sends a message the agent process and awaits an acknowledgment or rejection of the request. If the request is allowed, the three processes comprising the agent process, the calling party process and the supervisor process perform a hand-off of their associated lines to a conference process, which manages the lines until any party leaves the conference. At this point the conference process performs a hand-off of the parties back to the original processes for subsequent handling.

Thus in such a system, even with the agent's line being marked as busy, the supervisor can join the conversation in a conference.

In the event additional callers are required to join the conference, the conference process accepts or rejects the request and exchanges messages with all associated processes to add the new caller, if accepted.

The above process can be implemented with ownership management, ownership management being the subject of the present invention. The ownership management is preferably used in conjunction with the free list described in the aforenoted patent.

In accordance with an embodiment of the present invention, a method of management of resources in a multiple process system is comprised of providing a list of resource owner identities, storing in an owner list the identity of at least one process (process) with a resource with which the at least one process has a right to interact and use, allowing any process listed with a resource to use the resource, and barring access of the resource to other processes in the event there is at least one process listed with the resource.

In accordance with another embodiment, the method includes providing a free list of available resources, marking a resource in the free list as busy when the resource in the free list has a process stored with it in the owner list, and marking the resource in the free list as idle when the resource in the free list has no process stored with it in the owner list.

It should be understood that the present invention is not restricted to be used with ACD systems, but is applicable to the management of any analogous resource, the use of which can be controlled by the system. Thus while an example will be given of the use of the invention in an ACD system, it can be used to manage any multiprocessing system which contains plural processes that must use and share resources amongst themselves, such as a PABX or other system.

BRIEF INTRODUCTION TO THE DRAWINGS

A better understanding of the invention will be obtained by considering the detailed description below, with reference to the following drawings, in which.

Figure 8:
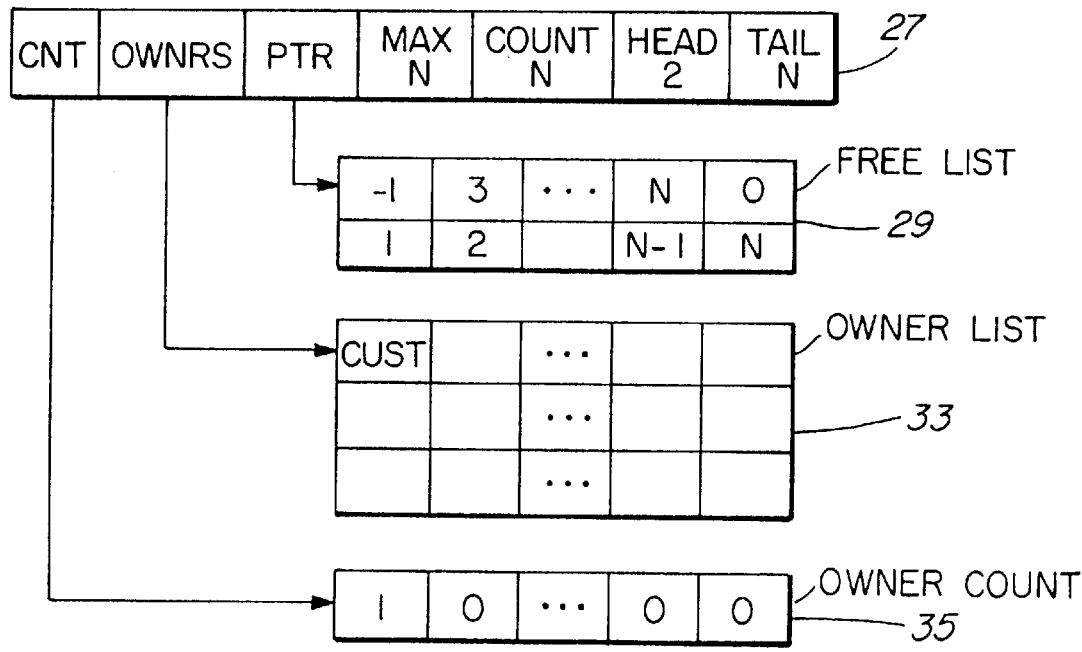
Figure 9:
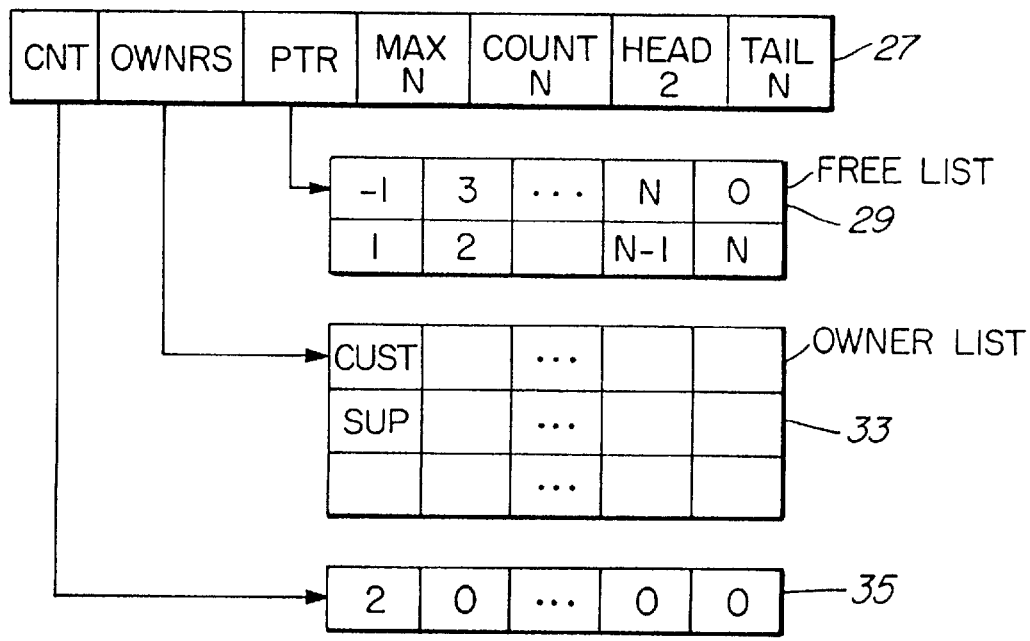
Figure 10:
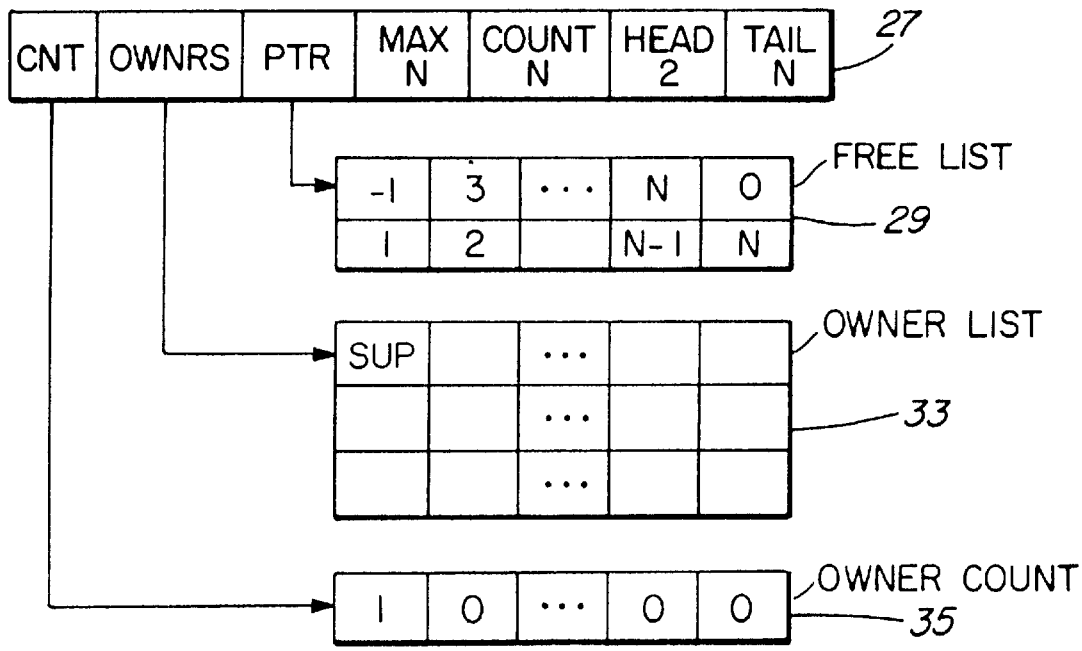
Figure 11:
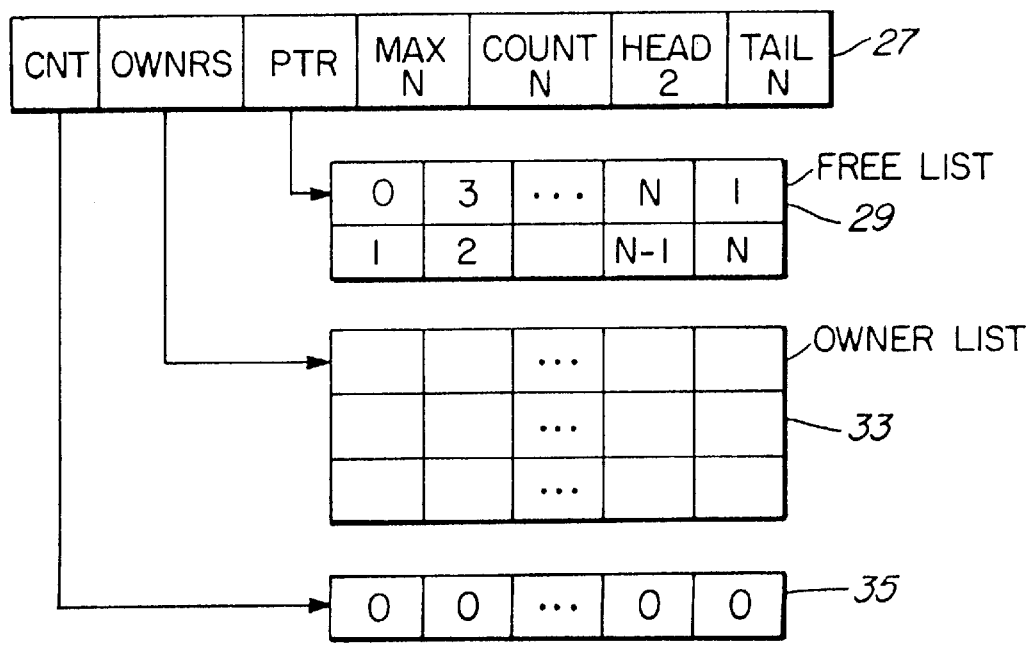

FIG. 8 is an illustration of a free list facilities data structure after a process has become listed as an owner of a resource, FIG. 9 is an illustration of a free list facilities data structure after a second process has become listed as an owner of a resource, FIG. 10 is an illustration of a free list facilities data structure after the first owner process has become unlisted as an owner of a resource, FIG. 11 is an illustration of a free list facilities data structure after a second process has become unlisted as an owner of a resource.

DETAILED DESCRIPTION OF PREFERRED EMBODIMENT

Figures 1, 7:
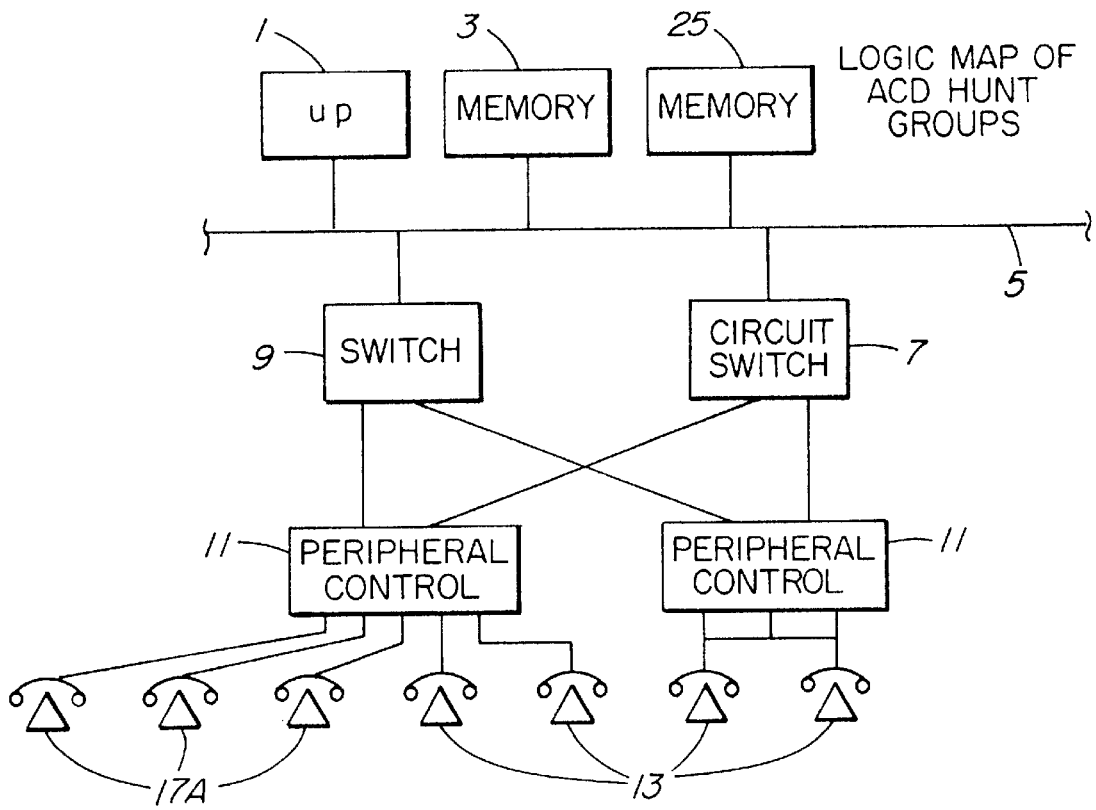
FIG. 1 is a block diagram of a telephone switching system in which the present invention can be implemented.
FIG. 7 is a pseudo-code description of a function "can_become_owner_of"

FIG. 1 illustrates a representative system in which the invention may be contained. The basic system may be as described for example in U.S. Pat. Nos. 4,616,360 and 4,615,028, invented by Conrad Lewis et al, which are incorporated herein by reference.

Basic elements of that system are a microprocessor 1 and a memory 3 accessed by microprocessor 1, both of which are connected to a main system bus 5. Memory 3 contains the main operation programs of the system as well as data as to the status and location of lines and trunks, etc.

A circuit switch 7 and a message switch 9 are connected to bus 5 for control by microprocessor 1. Peripheral control systems 11 are connected to line circuits to which telephones 13 are connected, and are connected to circuit switch 7 for switching telephone circuits between telephones 13 and trunks in order that communication signals may pass therebetween. The peripheral control systems 11 are also connected to message switch 9, whereby control messages from microprocessor 1 may be passed thereto, for controlling the line circuits or other peripheral circuits or for other well known peripheral control duties.

Agent terminals 17 such as telephones are connected to peripheral control system 11.

In general the agent terminals are grouped into hunt groups (which may be only a single hunt group or many hunt groups). When a call is received to e.g. a particular number such as an 800 number, the microprocessor, comparing the called number with a hunt group list stored in memory 3, checks the number stored in memory 3 and routes the call to one of the agent terminals 17A within the designated hunt group.

It should be recognized that in another design, an ACD circuit can be connected to the main bus 5 and can be accessed directly by microprocessor 1 from that bus, or an ACD circuit can be connected to a peripheral control system 11. Whether agent terminals 17A are connected to such ACD circuits or whether they are connected directly to line circuits accessed by the peripheral control system 11 is not consequential to the present invention. Techniques for detecting the off-hook condition of a terminal and of connecting it to another terminal are well known, and a description thereof would be redundant.

In accordance with the prior art, to determine the oldest available agent, a so-called free list of signals representative of the number of each available agent (i.e. the terminal number of that agent), each associated with one or more hunt group numbers, was stored. For example, each hunt group number "2000" would have the customer designated agents associated therewith, e.g. "5001", "5002" . . . "5010". The number of records in the free list would be equivalent to the maximum number of agents which could be programmed into the entire system. Each agent record is associated with a unique agent number.

When an agent logs onto the system, the agent number is added to the end of the free list, thus indicating that the agent is ready to receive calls.

When a call arrives for a hunt group number, the microprocessor accesses the free list and begins a search for the longest idle agent for that hunt group, starting from start to end of the free list. For every agent on the free list, the look-up checks to determine if the agent is a member of the desired hunt group. The first positive determination is thus an indication that the associated agent number designates the longest idle agent, due to the ordering of the list. The microprocessor then controls the telephone system to route the call to that longest idle agent, and the agent record is logically removed from the free list. This is achieved by adjusting the free list linkages to skip the removed record.

When the agent completes the servicing of the call and returns to the idle state, the agent record is logically added to the end of the free list. Since that agent record is added to the end of the free list, the records are automatically in the longest idle agent order if the free list is traversed from beginning to end.

In prior art systems, memory 25 is provided connected to bus 5 for access by processor 1. Memory 25 is stand alone, or part of memory 3.

Figure 2:
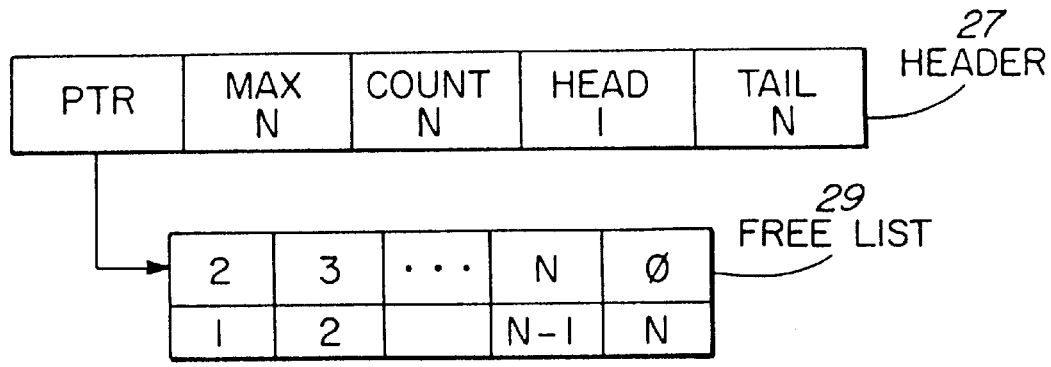
FIG. 2 illustrates the content of a memory in FIG. 1 after initialization in accordance with the prior art.

FIG. 2 illustrates the signal content of memory 25 immediately after initialization when all agents are idle. Memory 25 stores signals which allow the processor to designate which agent (i.e. element) is to be used to service a call.

The stored signals are comprised of a header (record) 27 as well as a free list 29. The free list contains in successive memory locations 1, 2, . . . N−1, N, the identifier of the next "longest-idle" agent. Traversing this list, we see that the longest idle agent is agent "1", followed by "2", "3" and so on. Somewhere in the system, there is an association agent "1" and the agent's extension number (e.g. 5001, 5002, etc.).

A second field MAX contains a count N of the maximum number of elements, e.g. the maximum number of agents which can log onto the system. The next field COUNT contains a signal which indicates the maximum number of free elements, e.g. the number of free agents. Immediately after initialization, the maximum number of elements equals the number of free elements, shown as N.

The next field, HEAD, is an index pointer to the first record in the free list 29 which is free. Immediately after initialization, it is to record 1, as shown.

The last field, TAIL, is an index to the record of the youngest available element, shown as record N of the free list.

If a different scheme than oldest to youngest were used, HEAD would point to the record of the first element of the list, and TAIL to the record of the last.

In use, the microprocessor 1 accesses the header. The pointer PTR points to free list 29 which contains the list of all idle agents. The processor checks the header and then accesses the record of the element, e.g. agent, pointed to by the HEAD byte. In the case of FIG. 2, the pointer HEAD is to the first record in the free list 29.

Figure 3:
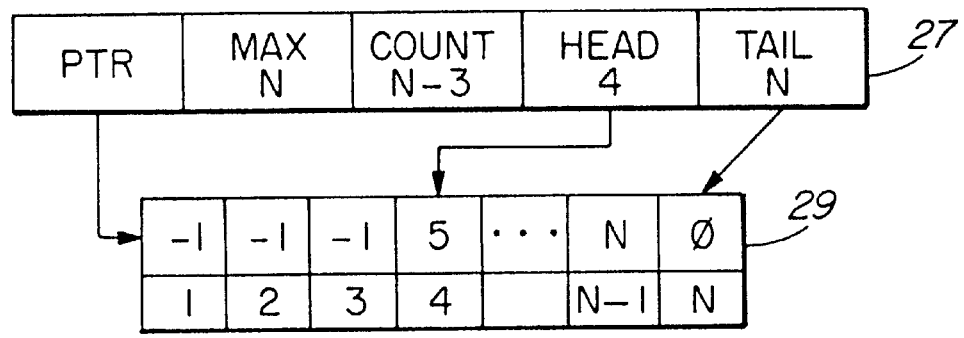
FIG. 3 illustrates the content of the memory in FIG. 1 after initialization at a point during use.

The processor then routes the call to the agent designated by the number stored in the record of the free list (e.g. agent 2), and changes that record number to a special designator, such as −1, as shown in FIG. 3. The number stored in the HEAD byte is then changed to the numeral 2, designating record number 2, and the number stored in the COUNT byte is decremented by 1.

FIG. 3 illustrates the state of the header 27 and free list 29 after the first three agents have been made busy and their records changed to −1. It may be seen that the number stored in the HEAD byte is 4, pointing to the fourth record in the free list. The number stored in the COUNT byte is N−3, which indicates how many agents are left in the free list. The first three records store the numeral −1, since the associated agents are no longer free.

Thus when the processor wishes to connect the call to the longest idle agent, accessing the HEAD field in the header 27 points the processor directly to record number 4 where the search begins for the longest idle agent in the requested hunt group. In case the COUNT has been decremented to zero, the processor can route the incoming call to a recorded announcement. Each record needs to be read until the longest idle agent for the hunt group is found.

Figure 4:
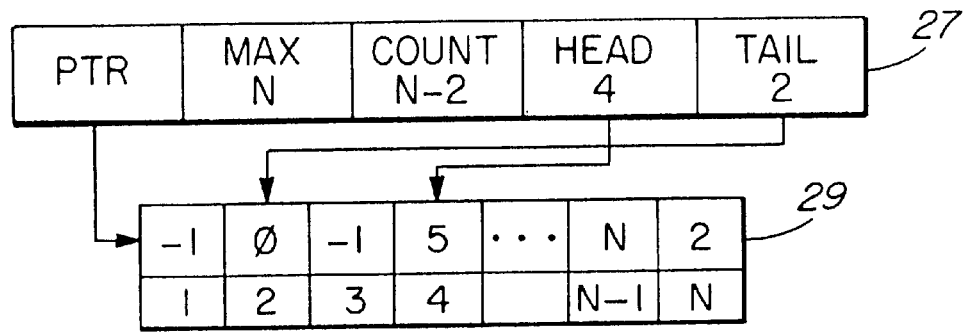
FIG. 4 illustrates the content of the memory of FIG. 1 after initialization at another point during use.

FIG. 4 illustrates the state of the header 27 and free list 29 after, for example agent or element designated by reference numeral 2 has completed its servicing of a call and is returned to the free list. Each successive digit number or element which becomes free is returned to the record immediately following the record number of the youngest idle element, which is designated by the content of the TAIL field in header 27.

In FIG. 4, for example, the HEAD byte in header 27 points to record 4 in the free list, which is the first agent in the free list, while the TAIL byte of header 27 indicates the last agent in the free list is agent 2. When scanning the free list, therefore, the oldest idle element would be indicated immediately as agent 4. Each field in the free list is accessed sequentially, looping from the oldest to the newest record, the TAIL of the free list pointing to record number 2, which represents agent number 2. It may be seen in FIG. 4 that record N contains element number 2, which had been placed in that record since agent 2 had been returned to the free list.

It may be seen that as there are only two elements in free list 29 indicated as being busy, those designated in the first and third records as −1, the byte stored in the COUNT field of header 27 is N−2.

Items returned to the free list need not necessarily be placed as the youngest record, but could be returned anywhere in the free list, depending on the application. Further, the processor could scan the free list in any desired manner, not necessarily in a looping sequence from the oldest idle element to the youngest idle element, as described above.

Figure 5:
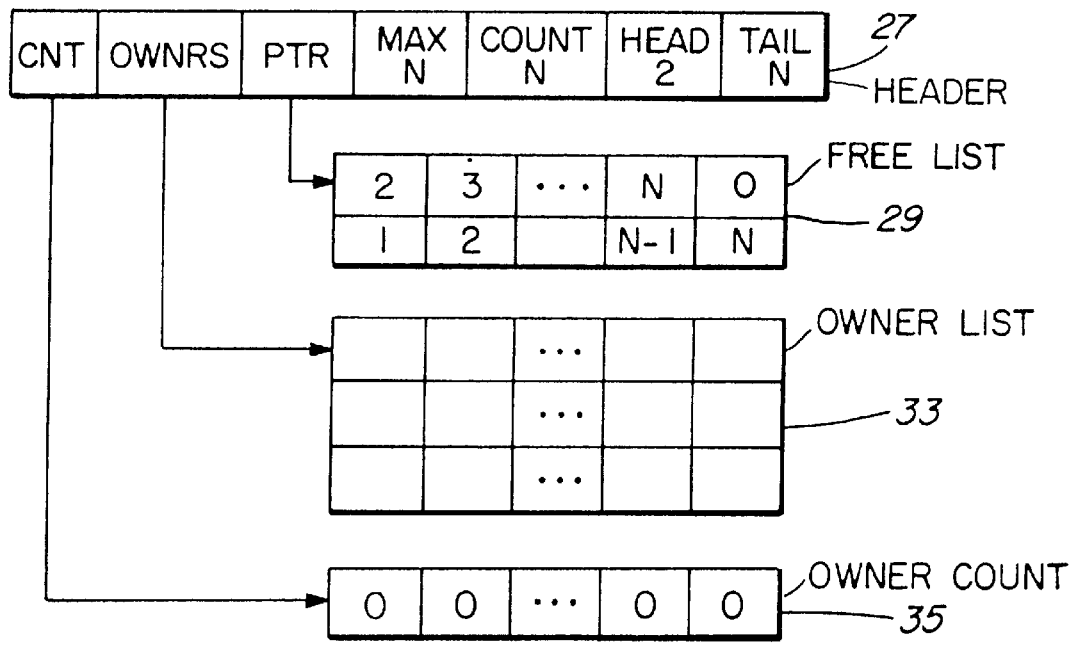
FIG. 5 is an illustration of a free list data structure after initialization.

In accordance with an embodiment of the present invention, the header 27 in any such system is expanded as illustrated in FIG. 5 to include a field OWNRS which contains a pointer to an owner list 33. An entry in this field is an indicator that the free list is resource ownership managed.

The header also includes a field CNT, which contains a pointer to an owner count record 35 which contains fields containing a count of how many owners there are of each of the resources, i.e. how many processes have access to a particular resource during a particular time.

The owner list 33 and the owner count record 35 can be stored in a table or tables in the same memory as free list 29.

The owner list and the owner count record are used to coordinate the allocation and release of resources to the proper owners.

Figure 6:
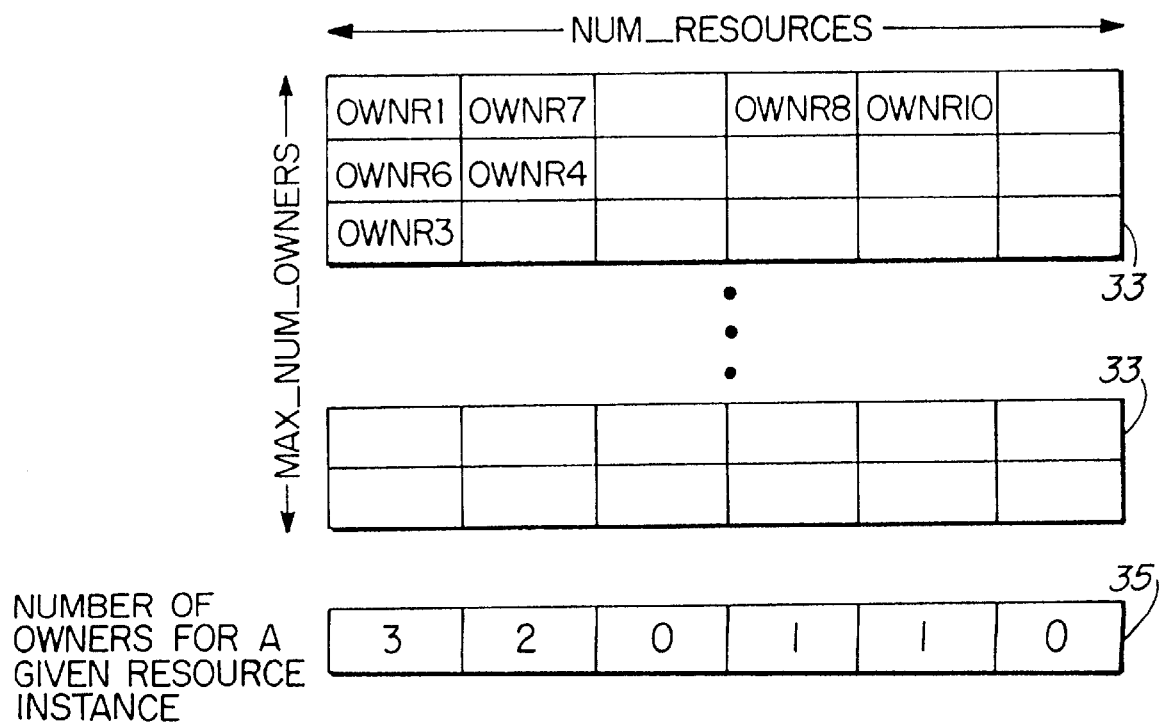
FIG. 6 is an illustration of a logical structure of an owner list and owner count in accordance with an embodiment of the invention.

Reference is now made to FIG. 6, which illustrates the owner list 33 and the owner count record 35 in more detail. When ownership management is enabled, for example by reading the OWNRS field in header 27, a list of owners for a given resource is stored in table 33. The list of owners in table 33 can be represented by a number of different data types, but can be thought of logically as a two dimensional array as illustrated in FIGS. 5 and 6. In additional, a one dimensional array containing the owner count 35 is also used, to contain the number of owners for a given resource instance.

The structure which stores resource owners has columns labeled num_resources, wherein each column contains an identity of the owners (referred to herein simply as "owners" of a given resource instance. By "owners" is meant "the right to use"). The rows are labeled max_num_owners, designating the quantities of resource owners that can be given ownership of a given resource.

In the example shown in FIG. 6, in the case of the resource instance corresponding to the second column of the table, there are two entries corresponding to its owners ownr7 and ownr4. The second element of the one dimensional array (the owner count 35) stores the number of owners for the resource instance corresponding to the second column of the table, and in this case contains the number 2, corresponding to the two entries for this resource. Similarly, the first entry of the one dimensional array stores the number 3, corresponding to the three owners ownrl, ownr6 and ownr3 of the resource corresponding to the first column in the owner list array 33.

The purpose of ownership management is not solely to store owners, but also to prevent certain potential owners from becoming owners of a resource. If we consider an example where the owners of resources are processes, a request by a process to obtain ownership of a resource may be denied based on predetermined characteristics of the requester or of the current owners of a resource.

As functions of the free list management facility are called, the owner list and owner count of resources are updated to reflect the operations performed by these functions. It should be recognized that many different types of owners can be allocated against resources, such as C++ or Smalltalk objects, processors, etc.

Five functions or routines can be used to implement a preferred embodiment of the present invention, as will be described below. 1. A function "initialize_free_list" should be called to initialize the free list of available resources, and to set each resource's number of owners to zero. Once initialized, the owner list 33 and the free list 35 will be as shown in FIG. 5, wherein no owners are entered in the owner list, and the owner count for all resources is zero.

When this function is called, the selection criteria that must be met for an owner to be successfully granted ownership of a resource should be defined. These criteria can be defined in any number of ways, such as a function call, hard coded decision statements, etc. For example, an agent process can be hard coded logically so that it cannot own another agent resource, but a supervisor process can be hard coded logically so that it is allowed to own any agent resource, or only certain agent resources.

This initialization function should be the first function of the free list management facility called, since all other functions of the facility should be able to assume that the structures have been initialized.

2. A function "get_resource" should be called to obtain a free resource. When ownership management is enabled, this process is added to the list of owners for the resource being allocated, if it meets the selection criteria defined when "initialize_free_list" was called.

3. A function "return_resource" should indicate that the owner no longer requires a given resource, when called. The process which calls this routine is removed from the resource's list of owners. If after removing the caller of this routine from the list of owners, the list is empty, the resource is returned to the free pool.

4. A function "add_ownership" should allow several owners, in this case processes, to share and use a common resource. One way by which a process can use an already allocated resource is through the use of this function. By calling this function, a process is added to a resource's list of owners if it meets the selection requirements defined when "initialize_free_list" was called.

5. A function "transfer_ownership", when called, should allow a process to pass ownership from one process to another. Thus when an owner has finished using a resource, instead of returning the resource to the free pool, the owner can instead pass ownership on to another process. The process to receive ownership must meet the selection criteria that was defined when calling "initialize_free_list", or the transfer should not be successful.

An example will be given below in which ownership management is made of call agents in an ACD system, where call agents are considered to be resources, and the owners of such resources are processes associated with call parties which talk with a call agent.

Before agents can be allocated and obtained, the free list management facility must be initialized for use. This is done by the main system processor calling the function "initialize_free_list" with the following parameters:

(a) The resource type of free list management facility to be initialized. In this example, this would be agents.

(b) The number of agents in the system (N in this example).

(c) The selection criteria for ownership. In this example, the selection criteria can be encoded in a function called "can_become_owner_of". An example in pseudo-code of the function is shown in FIG. 7.

(d) The maximum number of concurrent owners for a given resource type, e.g. 3.

The data structure resulting from calling the initialization routine is shown in FIG. 5.

When a customer calls an 800 or 888 number which is part of an ACD system that uses the present invention, the facility creates a process which is associated with the incoming call from the customer. This process will be referred to below as the customer process. This newly created process then tries to obtain an agent to service the customer's call. To do this, the process calls the "get_resource" routine with, as a parameter, the resource type to be obtained, which is an agent in this case.

Assuming that there are free agents, the customer process becomes an owner of an agent, is entered into the owner list 33 in the column related to the agent, the owner count is incremented by one, and the customer's telephone line is connected to the telephone line of the agent by the telephone system, under control of the processor of the telephone or ACD system.

FIG. 8 illustrates the state of the above-described data structures at this stage. Agent No. 1 is updated in the free list 29 from agent availability 2 (FIG. 5) to −1 (busy), as described in the aforenoted U.S. Pat. No. 5,515,428. The owner list 33 is updated to enter the owner (process) CUST in the column relating to the particular agent (resource), as may be seen by comparing FIG. 5 and 8). The owner count for the particular agent is changed from 0 (FIG. 5) to 1 (FIG. 8).

Assume now that a supervisor is to be added to the conversation between the customer and the agent. The supervisor must first add itself as an owner of the agent. To do this, the "add_ownership" routine is called, e.g. by the supervisor dialing a predetermined code which is detected by the system processor, by closing a soft key switch on the telephone of the supervisor, etc. This results in the supervisor process SUP being added to the list of owners of the agent resource, as shown in FIG. 9, and the owner count for that resource being incremented from 1 to 2.

As noted earlier, the supervisor process cannot be added to the owner list unless it meets the selection requirement defined when "initialize_free_list" was called. When the supervisor requests that it should join the conversation, as noted above, its associated supervisor process sends a message to the agent process and awaits an acknowledgment or rejection of the request. The agent process can read the list of its owners from the owner's list to determine that the request should be accepted. If the request is accepted, the agent, customer and supervisor processes perform a hand-off of their associated call to a conference process which manages them until any party leaves the conference. At this point the conference process performs a hand-off of the parties back to the original processes for subsequent handling.

In the event that other parties are to join the conference, the conference process accepts or rejects the request by checking whether the other parties are listed as owners of the resource in the owner list.

In certain circumstances, a second agent may wish to consult a first agent. In this case, the second agent will try to add itself (the identity of its process) to the owner's list of the first agent resource, by the second agent's process calling the "add_ownership_routine". The ownership may not be granted, if the function shown in FIG. 7 returns FALSE. In this manner, the second agent process is barred from obtaining ownership of the first agent resource, and the lines of the two agents will not be connected by the system.

In the termination of the conference call between the customer, the agent and the supervisor, e.g. when the customer hangs up, the customer process calls the "return_resource" routine to indicate that the customer process no longer requires the use of the agent resource. The "return_resource" routine modifies the owner list entry for the agent to remove the CUST process owner, leaving the SUP process owner listed in the agent resource column, as shown in FIG. 10. The owner count for the agent resource is decremented by one from 2 to 1. Since an owner of the resource still exists (SUP), the availability of the agent in the free list remains −1, indicating that the agent is not available to take additional calls, and the agent is not returned to the free pool.

The conversation at this point is between the agent and the supervisor, since the customer has hung up.

When the supervisor hangs up, the supervisor's process calls the "return_resource" routine for the agent. The process SUP is removed from the agent resource record, resulting in the owner list as shown in FIG. 11. Since the supervisor's process was the only remaining owner, the owner count for the resource is decremented to 0, and the free list for the resource is changed from −1 to 0, indicating that the resource is free.

It will be recognized that the identity of the owner can be different than that described; for example the process identifier can be any data that will indicate a particular owner can own or operate the resource. The acceptance criteria used, when adding a new owner to the resource, can be changed at any time, including during the processing of a call.

While the example given above was specific to the processing of an ACD feature of a telephone switching system, the invention can be used for other purposes, such as to manage all subscriber calls in a PABX system. When a subscriber call is delivered to any destination, the destination can become owned by the subscriber process and a busy process. All subsequent calls to the destination would use the multiple owner resource management system described above to request ownership of the destination (i.e. accepted into the call in progress, or rejected from joining the call in progress), and to release the destination (drop from the call). When all owners of the destination have released ownership the destination becomes idle (free) and available for any new call.

A person understanding this invention may now conceive of alternative structures and embodiments or variations of the above. All those which fall within the scope of the claims appended hereto are considered to be part of the present invention.

We claim:

1. A method of management of multiple resources in a multiple process system having resources adapted to be owned by at least one process, said method comprising:

(a) providing a free list of all resources, (b) providing an owner list of resources indicating which processes are permitted ownership of each resource, (c) storing in said owner list the identity of a process owning a resource which said process has a right to own, (d) allowing only a process listed with a resource in said owner list to own the resource, and (e) marking a resource in the free list as busy when said resource is owned by a process stored with it in the owner list, and marking the resource in the free list as available when the resource in the free list is not owned by a process stored with it in said owner list.

2. A method as defined in claim 1, including (f) barring access to a resource to other processes when a process is listed as owning said resource and said resource is busy.

3. A method as defined in claim 1 in which the system is a PABX, resources are lines and trunks, and processes are incoming and outgoing call PABX control routines.

4. A method as defined in claim 1 including adding a further process to said owners list of a busy resource and allowing said further process to share ownership of said busy resource.

5. A method as defined in claim 4 including allowing said further process to share ownership of a busy resource if said further process has shared ownership access permission.

6. A method as defined in claim 4 in which the system is an automatic call distribution (ACD) facility, resources are call agents, and processes are incoming call (customer) processes, supervisor processes and free agent processes.

* * * * *